D. MORGAN.
APPARATUS FOR USE IN BUILDING STRUCTURES OF CONCRETE OR OTHER PLASTIC MATERIAL.
APPLICATION FILED DEC. 22, 1906.
913,538.
Patented Feb. 23, 1909.
5 SHEETS—SHEET 3.
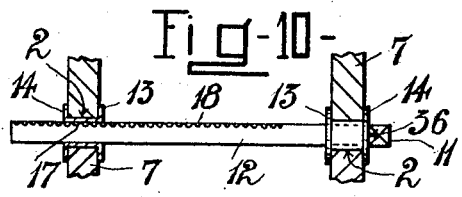
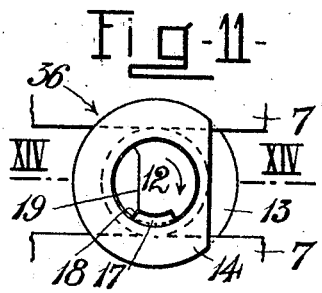
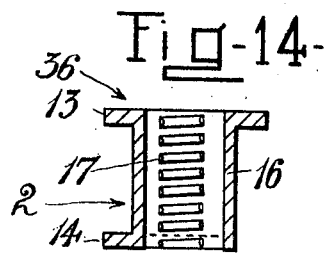
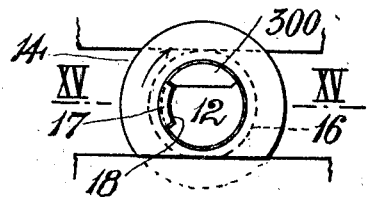
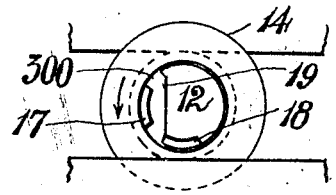
Witnesses
Walter C. Hart
William G. Holden
Inventor
David Morgan
by Eas Bates Sons
Attorneys D. MORGAN.
APPARATUS FOR USE IN BUILDING STRUCTURES OF CONCRETE OR OTHER PLASTIC MATERIAL.
APPLICATION FILED DEC. 22, 1906.
913,538.
Patented Feb. 23, 1909.
5 SHEETS—SHEET 4.
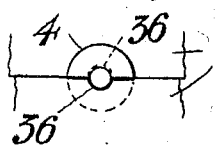
Fig-16-
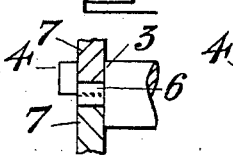
Fig-17-
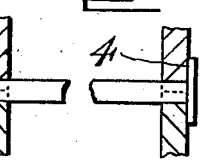
Fig-18-
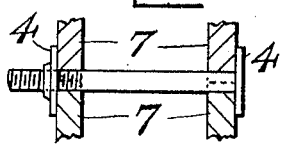
Fig-19-
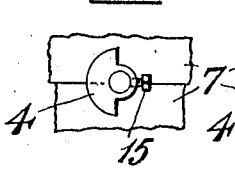
Fig-20-
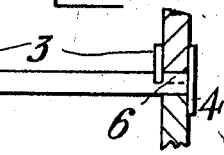
Fig-21-
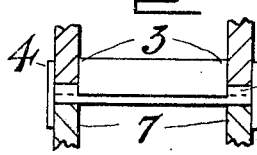
Fig-22-
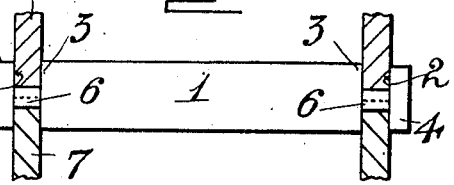
Fig-23-
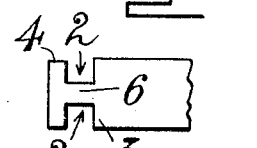
Fig-24-
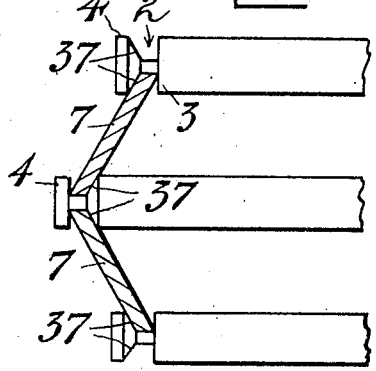
Fig-26-
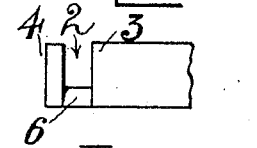
Fig-25-
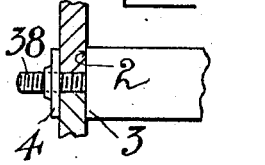
Fig-27-
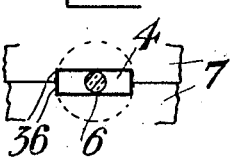
Fig-28-
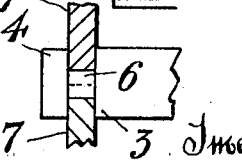
Fig-29-
Witnesses
Walter C. Hart
William G. Holden
Inventor
David Morgan
by Edw Waters & Sons
Attorneys D. MORGAN.
APPARATUS FOR USE IN BUILDING STRUCTURES OF CONCRETE OR OTHER PLASTIC MATERIAL.
APPLICATION FILED DEC. 22, 1906.
913,538. Patented Feb. 23, 1909.
5 SHEETS—SHEET 5.
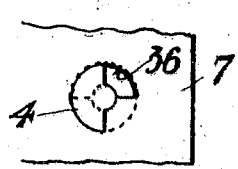
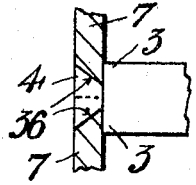
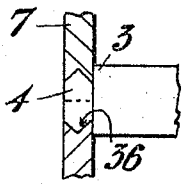
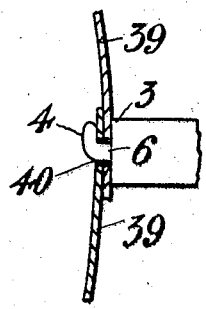
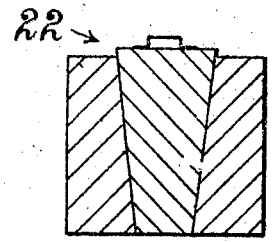
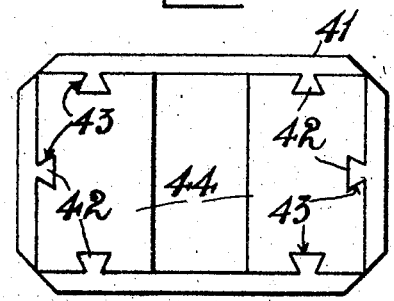
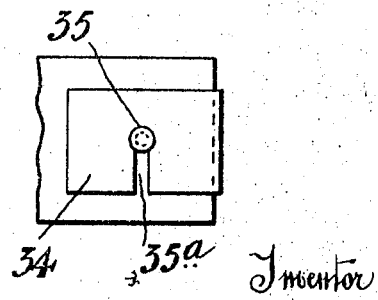
Witnesses
Walter C. Hart
William G. Holden
Inventor
David Morgan
by
Attorneys

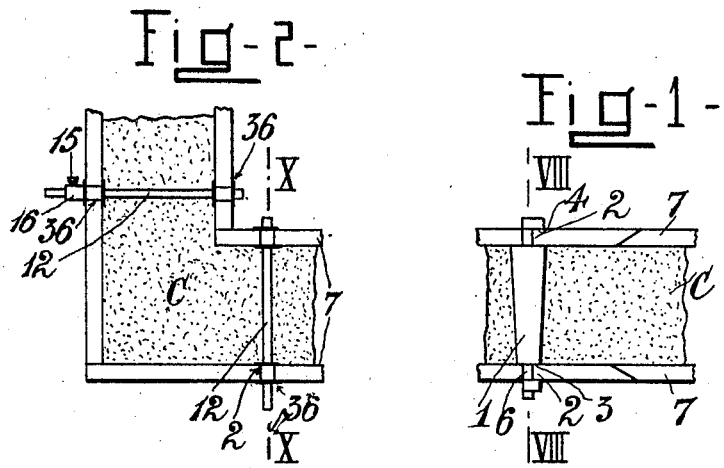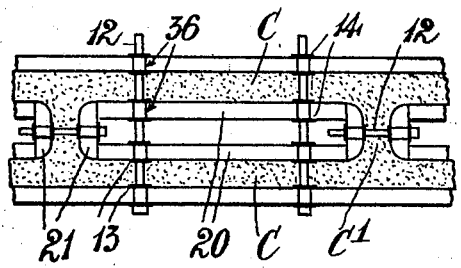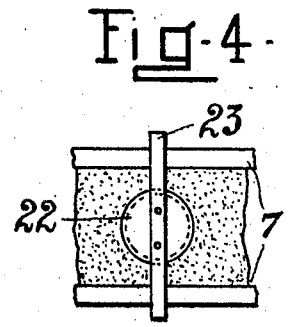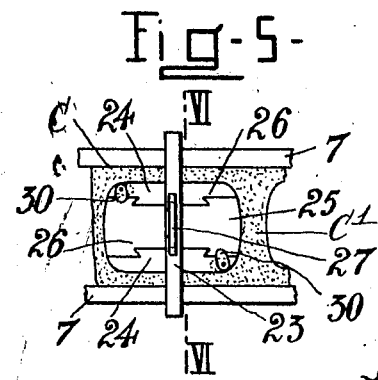

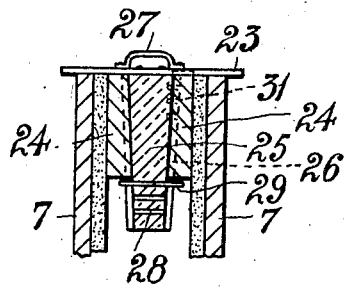
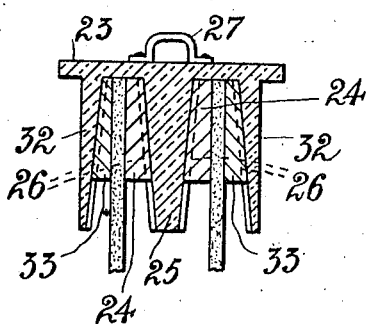
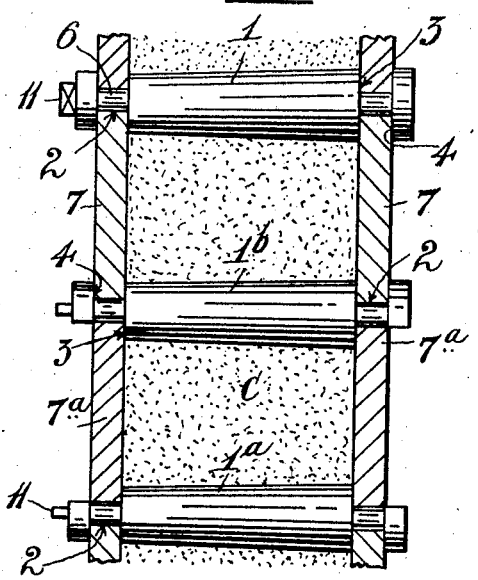
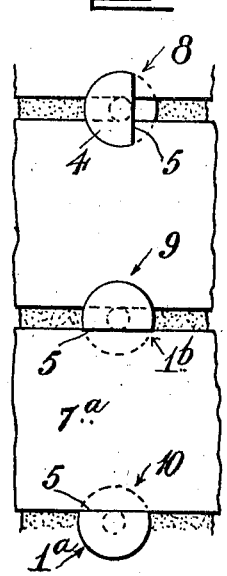
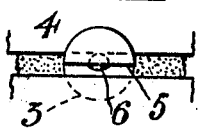

UNITED STATES PATENT OFFICE.

DAVID MORGAN, OF LAUNCESTON, TASMANIA, AUSTRALIA.

APPARATUS FOR USE IN BUILDING STRUCTURES OF CONCRETE OR OTHER PLASTIC MATERIAL.

No. 913,538.  Specification of Letters Patent.  Patented Feb. 23, 1909.

Application filed December 22, 1906. Serial No. 349,149.

*To all whom it may concern:*

Be it known that I, DAVID MORGAN, a subject of the King of Great Britain, residing at No. 49 Frankland street, Launceston, in the State of Tasmania, Australia, sculptor and mason, have invented Improved Apparatus for use in Building Structures of Concrete or other Plastic Material, of which the following is a specification.

This invention consists of an improved apparatus which is employed for the purpose of forming molds into which is thrown or placed concrete or other plastic material, or such material in conjunction with large stones, bricks or the like when cheap work is required, and its especial advantage is its simplicity, in consequence of which it may be quickly erected and removed.

A further important advantage is that the apparatus consists of comparatively few parts, but sufficient for building purposes, as when each layer of the concrete sets, the lower parts of the apparatus are removed and used for the molds above, hence the necessity of erecting lofty framework and the expense entailed thereby is obviated.

The essential feature of this invention consists in the use with mold boards of removable tie rods so constructed as to hold the boards in position while the concrete or the like is being filled in and while it is setting after which the boards as well as the rods are removed.

The tie rods, which may be of any suitable shape in cross section, are so formed at their ends as to prevent the mold boards shifting transversely or longitudinally thus insuring a true vertical and horizontal alinement of the structure, while at the same time said rods and also the mold boards are capable of being removed at will.

This invention is equally applicable to solid walls, hollow walls or walls formed primarily with a cavity and subsequently filled in, and it will be obvious that a certain amount of variation in the apparatus is necessary to accommodate the molds to the shape of the projections depressions or cavities in a building. For example the apparatus comprises an especial mold for forming vent flues and another mold of different shape for forming smoke flues as will be readily understood.

The drawings illustrating the invention comprise a number of views showing the most common form of appliances herein employed for constructing a building of concrete and are to be understood as merely examples of the use to which the general apparatus is applied.

Figure 1 is a plan of a solid wall showing in position one form of the tie rod, and Fig. 2 a similar view showing two kinds of adjustable tie rods. Fig. 3 is a plan showing the method of constructing a hollow wall with adjustable tie rods. Fig. 4 is a plan showing a tapering mold or core for forming vent flues or a series of cavities in a wall. Fig. 5 is a plan showing an adjustable mold box for forming smoke flues or a series of cavities in a wall, and Fig. 6 is a vertical section on line VI—VI Fig. 5. Fig. 7 is a similar view to Fig. 6 showing a modification thereof. Fig. 8 is an enlarged vertical section on line VIII—VIII Fig. 1, and Fig. 9 is a side elevation thereof. Fig. 9$^a$ is an end elevation of the rod showing a variation in the end thereof. Fig. 10 is an enlarged vertical section on line X—X Fig. 2. Figs. 11, 12 and 13 are enlarged end elevations of the adjustable tie bars and the method of releasing the mold boards. Fig. 14 is a horizontal section on line XIV—XIV Fig. 11. Fig. 15 is a horizontal section on line XV—XV Fig. 12. Fig. 16 is an end elevation showing a slight modification of the rod as seen in Fig. 9$^a$ and, Fig. 17 is a side elevation thereof. Figs. 18, 19, 20, 21, 22, 23, 24 and 25 are views illustrating some modifications in the construction of the tie rod. Fig. 26, is a vertical section showing one method of forming projections on a building. Fig. 27 is a modification of the rod shown in Fig. 24. Figs. 28 and 29 are respectively an end elevation and vertical section showing another modification. Fig. 30 is an end elevation showing a tie rod passing through a board. Figs. 31 and 32 show modifications of the shape of the end shoulders of the tie rods. Fig. 33 is a horizontal section showing the adaptation of the tie rod for forming curved walls etc. Fig. 34 is a vertical section of a removable core box. Fig. 35 is a plan of a collapsible core box. Fig. 36 is an enlarged broken side elevation of the angle strap shown in Fig. 2.

According to this invention the tie rods consist of comparatively thin rods of wood, metal or other suitable material which are adapted to be placed transversely across the wall or the like in order to hold the mold boards in any desired position while the plastic material is being filled in.

In order to prevent the mold boards being thrust outwardly the rods are provided at their ends with abutments of such shape as to insure the boards being maintained in position until ready for removal, while the necks of the rods are adapted to fit corresponding recesses in the edges of the boards in order to prevent any longitudinal movement of the latter. It will be obvious that such abutments may be formed of a variety of shapes as for instance by providing either fixed or adjustable shoulders, collars, disks, flanges or nuts on the tie rods, or by forming grooves on the ends thereof as hereinafter described.

The tie rods are formed at their ends in such a manner that they may be readily removed if desired either by lifting the mold boards directly upwardly or outwardly and pushing the tie rods endwise out of their nest in the plastic material, or by partially rotating the rods and then withdrawing the boards and said rods.

Referring now particularly to Figs. 1, 8 and 9 of the drawings, it will be seen that the tie rod consists of a tapering rod 1 which may be straight, and is preferably circular in cross section and provided with a circumferential groove 2 formed therein at either end. The side of the groove 3 adjacent to the concrete C is circular and the side 4 remote therefrom forming an abutment or shoulder is either semi-circular as in Figs. 16 and 17 or approximately so as required and cut away as at 5 flush with the neck 6 of the groove in the manner clearly shown in the Figs. 1, 8 or 9.

If preferred the neck 6 of the groove may be flattened on the same side as the flat portion of the side 4 of the groove (Fig. 9ª) in order to clear the mold boards and so facilitate the removal of same when the tie rods are turned round as hereinafter explained.

The boards 7, 7, forming the sides of the mold are adapted to fit between the grooves on the tie rods and bear upon the neck 6 thereof, and although boards are preferred metal plates may be substituted therefor. Said boards are preferably formed with corresponding semi-circular or other shaped notches 36 cut in their edges into which the neck 6 of the collar fits as shown in Figs. 16 and 17 in order to allow the boards to abut against each other on either edge, and prevent a longitudinal movement of said boards thus insuring a building being truly erected. The boards are held in position by turning the tie rods into the position shown at 8 in Fig. 9, that is with the flat parts 5 of the semi-circular sides 4 of the groove in a vertical line. These boards and horizontal tie rods are shifted altered replaced or adjusted as the concrete is filled in and used for molding the next course of the work, and so on during the course of construction of the building. The lower boards are removed as shown in Fig. 9 by rotating the tie rods into the position shown in said figure at 9 and 10 when the flat parts 5 of the semi-circular sides of the grooves are horizontal and adjacent to each other. The lowermost board 7ª and the corresponding one on the opposite side may now be lifted side-wise from the concrete and the lowermost tie rods 1ᵇ removed by rotating same or imparting a lateral blow to the end 11 thereof (Fig. 8). The intermediate tie rod 1ᵇ is left in until the next course of concrete is laid and partially set and any of the tie rods may remain permanently embedded in the concrete to form plugs for internal or external fittings, or for the purpose of securing the boards permanently to the face of the walls.

Referring now to the various modifications of the tie rod, Fig. 18 shows one form of rod provided with a shoulder of any suitable shape at both ends which is employed for the purpose of holding boards permanently in position on the face of the wall.

Fig. 19 is a similar view to Fig. 18 but in this case one or both shoulders are removable and are screwed on the end or ends of the rod so that the space between said shoulders are adjustable and furthermore the rod may be readily removed from the wall by unscrewing one of said shoulders and then drawing the rod laterally.

Fig. 20 shows a rod with an approximately semi-circular shoulder at either end one of which may be adjustably secured to the rod by means of a screw 15 in the manner shown in Fig. 2.

Fig. 21 shows a rod adapted for use with hollow walls and is provided with a pair of shoulders at either end, the inner shoulders 3 of each pair being approximately semi-circular. By this arrangement the partial rotation of the rod will enable the mold boards to be moved inwards into the hollow of the wall from whence they may be withdrawn.

Fig. 22 is a similar arrangement to that shown in Fig. 21, the only difference being that the inner shoulders 3 are joined together.

Fig. 23 shows a rod with a continuous groove 2 formed in both ends thereof. In this adaptation the upper tie rods and the mold boards are first removed and then the lower tie rods. Instead of forming a continuous groove around the end of rod a partial groove only may be formed thereon by halving the rod longitudinally or two separate grooves may be formed on either side of each end of said rod in the manner shown in Fig. 24.

In Fig. 25 the groove 2 is so formed that the neck thereof is approximately flush on one side with the central body portion of the rod so that a partial rotation of the latter will free the boards.

Fig. 26 shows a tie rod similar to that shown in Figs. 16 and 17 but having one or more of the shoulders, forming the sides of the grooves, beveled as at 37 so as to enable mold boards to be held in an outwardly inclined position. This arrangement is advantageous when forming projections or moldings on walls.

In Fig. 27 the rod is provided at one end with a threaded neck or stud 38 upon which is screwed a nut forming the shoulder 4 and the boards fit into the grooves 2 formed between said nut and the shoulder 3 of the rod. It will be obvious that said movable shoulder may be secured in position on the rod by a pin or the like. The boards may be freed by lifting same or by removing the nut or shoulder 4 they may be removed outwardly.

In Figs. 28 and 29 the outside shoulder 4 is of slightly less depth than the rod and is flattened on two sides and adapted to pass through corresponding elongated notches 36 formed in the edges of the boards until the neck 6 fits into said notches after which the rod is partially rotated into the position shown in Fig. 29 when the shoulder holds the boards in position. By again reversing the rod until the shoulder 4 is opposite the notches 36 in the boards it may be withdrawn. The notches or holes 36 may be formed through the boards in which case they would be approximately semi-circular and have preferably a recess to fit the neck of the shoulder 4 of the rod and said shoulder would be also approximately semi-circular as shown in Fig. 30 of the drawings.

Figs. 31 and 32 show examples of the various shapes the end shoulders may take. In this case the notches 36 in the boards have their edges shaped similarly to the end shoulders so that when fixed in position they lock with the boards and prevent same from moving laterally or longitudinally.

Fig. 33 shows the application of the rod when building curved walls as in the construction of wells, pipes, chimneys or the like. In this case the flat mold boards are not suitable and in lieu thereof curved metal or other plates or boards 39 are employed and the latter are provided near their meeting edges with corresponding elongated slots 40 through which the flattened shoulder 4 of the tie rod is passed for the purpose of securing said edges. The rod in this case is only provided with a pair of shoulders at one end and one such rod is used for joining the edges of each curved plate.

When using the above-mentioned tie rods it is necessary to have several sizes to suit walls of varying thickness but with the tie rods shown in Figs. 2, 3, 10, 11, 12, 13 and 15 the molds may be adjusted to apply to walls of any width. Accordingly said tie rods are formed of comparatively thin straight steel or other metal rods 12, and the grooves 2 thereon are formed of collars or shoulders 36 each provided with a pair of disks or flanges 13, 14 set at the required distance apart to suit the mold boards which fit into said grooves. One flange 14 of each collar is approximately semi-circular and by preference one collar is fixed to one end of the tie rod and the other is hollow or reel shaped and adapted to slide along said rod and be secured thereto at any part of its length. Said adjustable collar may be clamped in position by a set stud 15 passing through an extension 16 of the barrel of the collar as shown in Fig. 2, or said collar may have a narrow strip of internally projecting teeth 17 (Fig. 14) extending longitudinally along its inner periphery and adapted to engage with corresponding teeth 18 cut out of the exterior periphery of the tie rod (Fig. 15). With this latter construction which is shown clearly in Figs. 11, 12 and 13 the tie rod 12 is cut away or flattened as at 19 to permit the collar to move freely along the tie rod until in position when said collar is given a partial rotation in the direction of arrow in Fig. 13 and the teeth 17 engage with the recessed teeth 18 of the tie rod and the two parts lock together in the manner shown in Figs. 11 or 12. By now engaging the end 11 of the rod it may, in conjunction with the collar, be rotated in the direction shown by arrow in Fig. 11 for the purpose of enabling the grooves to be engaged with or disengaged from the mold boards. When it is desired to remove the adjustable collars to free the boards said collars are rotated in the direction shown by arrow in Fig. 12 when the teeth thereon are disengaged from those of the rod and they enter the space 300 formed between the flattened portion 19 of the rod and the internal periphery of the barrel 16 of the collar 36 so that said rod may be drawn through the collars and the whole removed from the wall. It will be obvious that the teeth formed on the collar and rod may be of variable shape.

Fig. 3 shows the application of the adjustable tie rod just described, to the construction of a hollow wall in which case additional collars are employed for holding the inner mold boards 20 and similar but shorter tie rods are employed for securing the transverse boards 21 used in forming the cross stays C¹ of concrete joining the two skeleton walls C.

Referring now to Fig. 4 the device shown therein consists of a tapering metal or wooden mold or core 22 having a horizontal bar 23 across the top adapted to rest across the top edges of the boards and it is employed for forming a cavity suitable for vent flues in a solid wall or for forming a series of cavities therein. The taper on said core renders it easily removable from the concrete when the latter is partially set. Instead of the core as above described it may be formed in three pieces Fig. 34 the two outer ones of which are inclined on their opposing sides, while the central one is tapered. It will be obvious that if the core is rectangular the central piece thereof would be wedge shaped.

Fig. 35 shows a collapsible core box 41, the sides and ends of which are separate and formed on their inner sides with vertical ribs 42 shaped to correspond with and fit grooves 43 formed in one or more blocks 44 adapted to be placed in said box for the purpose of holding the sides and ends together. It will be readily understood that the grooves may be formed on the sides and ends of the box and the ribs on the blocks.

Figs. 5 and 6 show an adjustable mold box or core for forming smoke flues or a series of cavities in a wall. It consists of two adjustable parts 24, 24, having their adjacent sides tapered as shown and a third or comparatively long central part 25 correspondingly tapered on two sides and adapted to engage with the said parts 24, 24, by means of dovetail joints 26. Said central part is provided at its upper end with a horizontal bar 23 adapted to rest on the vertical mold boards and also with a handle 27 and at its lower end it is provided with transverse holes 28 into which a projecting removable pin 29 is inserted and the outer parts are provided on the top with pivoted cam-shaped plates 30 adapted to engage with the top of the central part or with one of a series of transverse slots 31 formed in the sides thereof. With this construction the raising or lowering of the central part 25 causes the outer parts 24, 24 to move in or out respectively so as to adapt the core to form a flue or cavity of any desired width. The parts are locked together by turning the cam-shaped plates 30 across the top of the central part 25 or into engagement with one of the slots 31. In order to remove the box the central part 25 is lifted slightly which draws the parts 24, 24 nearer each other, then the lateral pin 29 engages the underside of the latter so that by a continued upward lift of the central part the whole core or box is lifted out of the concrete when the latter is partially set. A modification of this latter construction is shown in Fig. 7. In this instance the central tapering part 25 of the box is provided with two additional side pieces 32, 32, which depend from the horizontal bar or plate 23 and are tapered on one side in an opposite manner to the adjacent sides 24, 24 of said central part. The tapering sides of said additional side pieces 32 are connected by dovetail joints 26 with correspondingly tapered mold boards 33. The effect of this arrangement is that by raising the bar 65 or plate 23 from which depends the central part 25 and the two side pieces 32, the space between the mold boards is widened and the space between the parts 24, 24 is decreased while the opposite effect is obtained by lowering said bar.

In order to connect the mold boards at the junction of walls angular straps 34 are used, each side of which is adapted to be secured to the boards by either removable or fixed pins or the like 35 extending laterally therefrom and fitting slots 35ª formed in the lower edge of said straps (Fig. 36). It will be obvious that when it is desired to brace the meeting ends of two boards the strap would be flat. It is to be clearly understood that with the rods formed as herein described the boards may be held in any position as for instance in building floors or ceilings the rods would be vertical and the boards horizontal and all ties decorations or ornamentations can be put in as the construction of the building proceeds.

It will be obvious from what has been hereinbefore stated that my mold comprises sides, and a tie-rod having an abutment adapted when in its operative position to hold one of the mold sides against lateral displacement, said abutment having a releasing face and being turnable to bring said face into position to permit relative lateral displacement of said sides. In the present instance I obtain the turning of said abutment by turning the tie-rod with which it is connected; this, of course, however, is not essential. Preferably the sides of the mold are of sectional character, the sections being superposed and the outer portions of such rods extending between the adjacent edges of said superposed sections. The part 4 to which reference has been hereinbefore made is one illustration of such an abutment or shoulder as that to which I have referred, and the flattened face of said abutment constitutes a simple and convenient way of forming a releasing face such as that to which allusion has also been made.

Having now particularly described and ascertained the nature of my said invention and in what manner the same is to be performed, I declare that what I claim is:

1. A mold comprising sides, and a tie-rod having an abutment adapted when in its operative position to hold one of the mold sides against lateral displacement, said abutment having a releasing face and being turnable to bring said face into position to permit relative lateral displacement of said sides.

2. A mold comprising sides, and a tie-rod having an abutment adapted when in its operative position to hold one of the mold sides against lateral displacement, said abutment having a releasing face, and the rod being turnable to bring said face into position to permit relative lateral displacement of said sides.

3. A mold comprising sides, and a tie-rod having abutments adapted when in their operative positions to hold the mold sides against lateral displacement, said abutments having releasing faces and being turnable to bring the faces respectively into position to permit relative lateral movement of said sides.

4. A mold comprising sides, and a tie-rod having an abutment adapted when in its operative position to hold one of the mold sides against lateral displacement, said abutment having a releasing face and being turnable to bring said face into position to permit relative lateral movement of said sides and being also adjustable transversely of the mold.

5. A mold comprising sides, and a tie-rod having abutments adapted when in their operative positions to engage against the outer faces of said sides to hold the same against outward displacement, said abutments having releasing faces and being turnable to bring said faces into position to permit outward movement of said sides.

6. A mold comprising sides, and a tie-rod extending across said sides, said rod having a substantially semi-circular abutment to coöperate with one of the sides and adapted when in its operative position to hold said coöperating side against lateral displacement, said abutment being turnable to bring it to a position to permit relative lateral displacement of the mold sides.

7. A mold comprising sides of superposed sections, a tie-rod extending across the mold and between the superposed sections thereof, the adjacent edges of the sections being notched to receive the rod, and the latter having abutments adapted when in their operative positions to prevent relative lateral movement of said sections, and said abutments having releasing faces and being turnable to bring said faces into position to permit said relative lateral motion of said sections.

8. A mold comprising sides of superposed sections, tie-rods for said sides extending between the superposed sections, the latter being notched in their adjacent edges to receive said tie-rods, and the latter having substantially semi-circular abutments adapted when in their operative positions to prevent relative lateral displacement of said sections.

9. A mold comprising sides, a tie-rod having an abutment adapted when in its operative position to hold one of the mold sides against lateral displacement, said abutment having a releasing face and being turnable to bring said face into position to permit relative lateral movement of said sides, said abutment being longitudinally adjustable on said tie-rod, and means for holding the abutment in an adjusted position on the rod.

10. A mold comprising sides, and a tie-rod having an abutment adapted when in its operative position to hold one of the mold sides against lateral displacement, said abutment having a releasing face and being turnable to bring said face into position to permit relative lateral displacement of said sides, the abutment being adjustable longitudinally of the rod, and the abutment and rod having coöperating means when the abutment is turned to a certain point to hold the abutment in an adjusted position.

11. A mold comprising sides in superposed sections, and tie-rods for the mold having necks of reduced diameter, the sections of the sides being notched to receive said necks, and the said necks carrying substantially semi-circular abutments to engage against the outer faces of said sides.

12. A mold including rotatable supporting members, stationary side walls detachably engaging the supporting members, a core member interposed between the side walls, and means for rotating the supporting members to release the side walls.

In testimony whereof I have hereunto set my hand in presence of two subscribing witnesses.

DAVID MORGAN.

Witnesses:
EDWARD WATERS,
WILLIAM HERBERT WATERS.